March 26, 1929.  J. T. SIMPSON  1,706,417
MIXING MACHINE
Filed Aug. 30, 1926  4 Sheets-Sheet 2
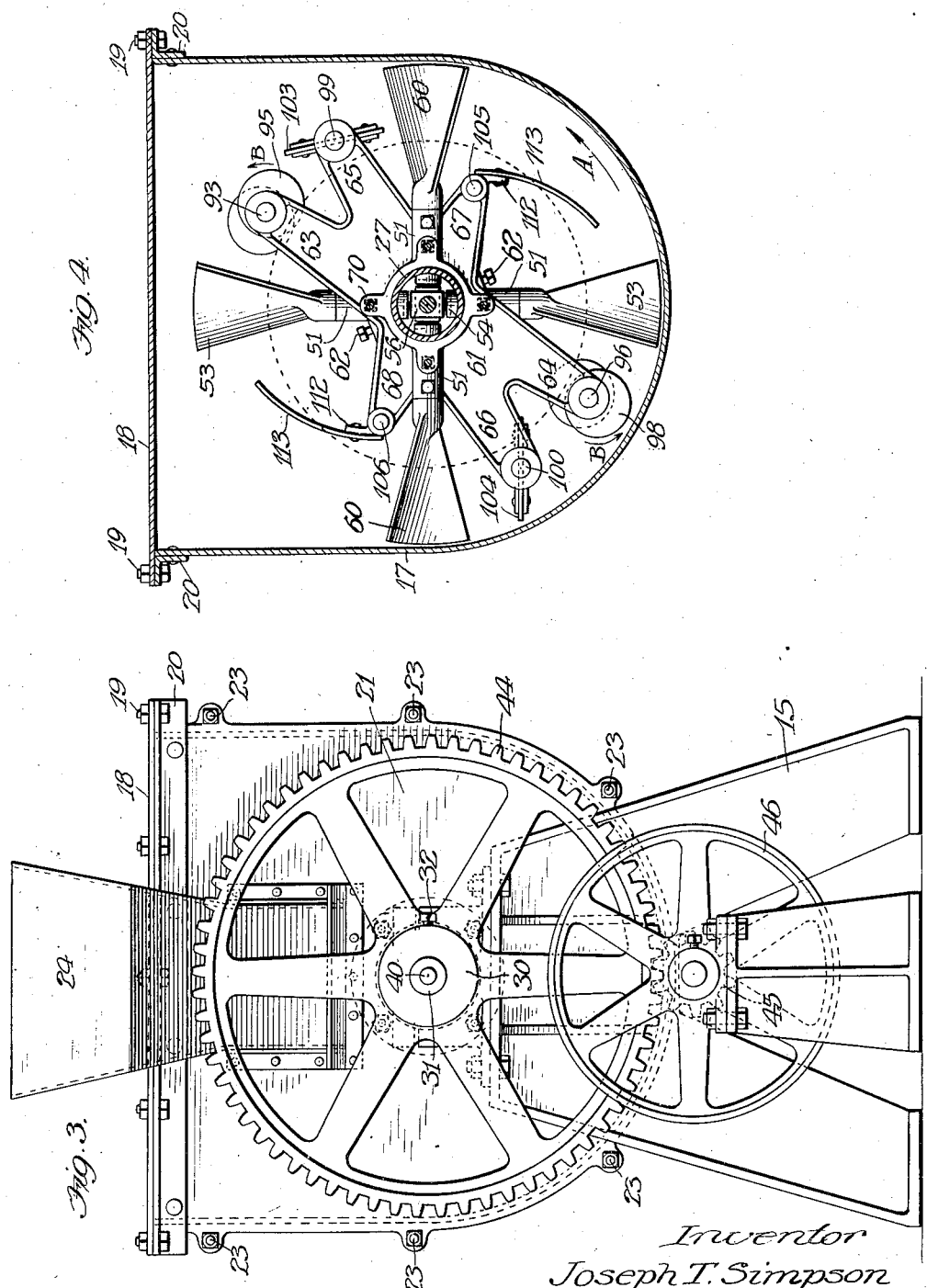
Inventor
Joseph T. Simpson
By Casper L. Redfield
Atty.
Witness
Martin H. Olsen

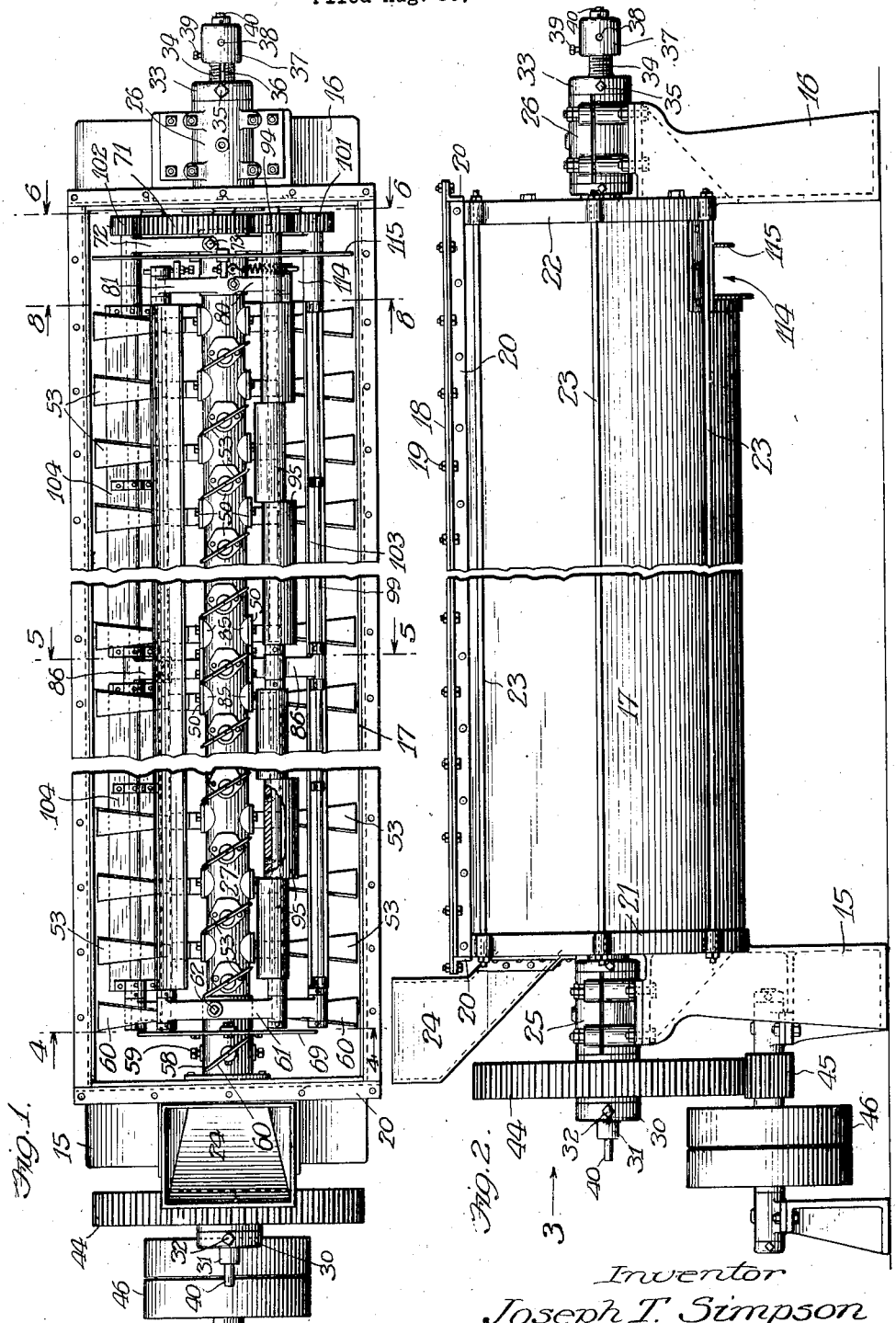

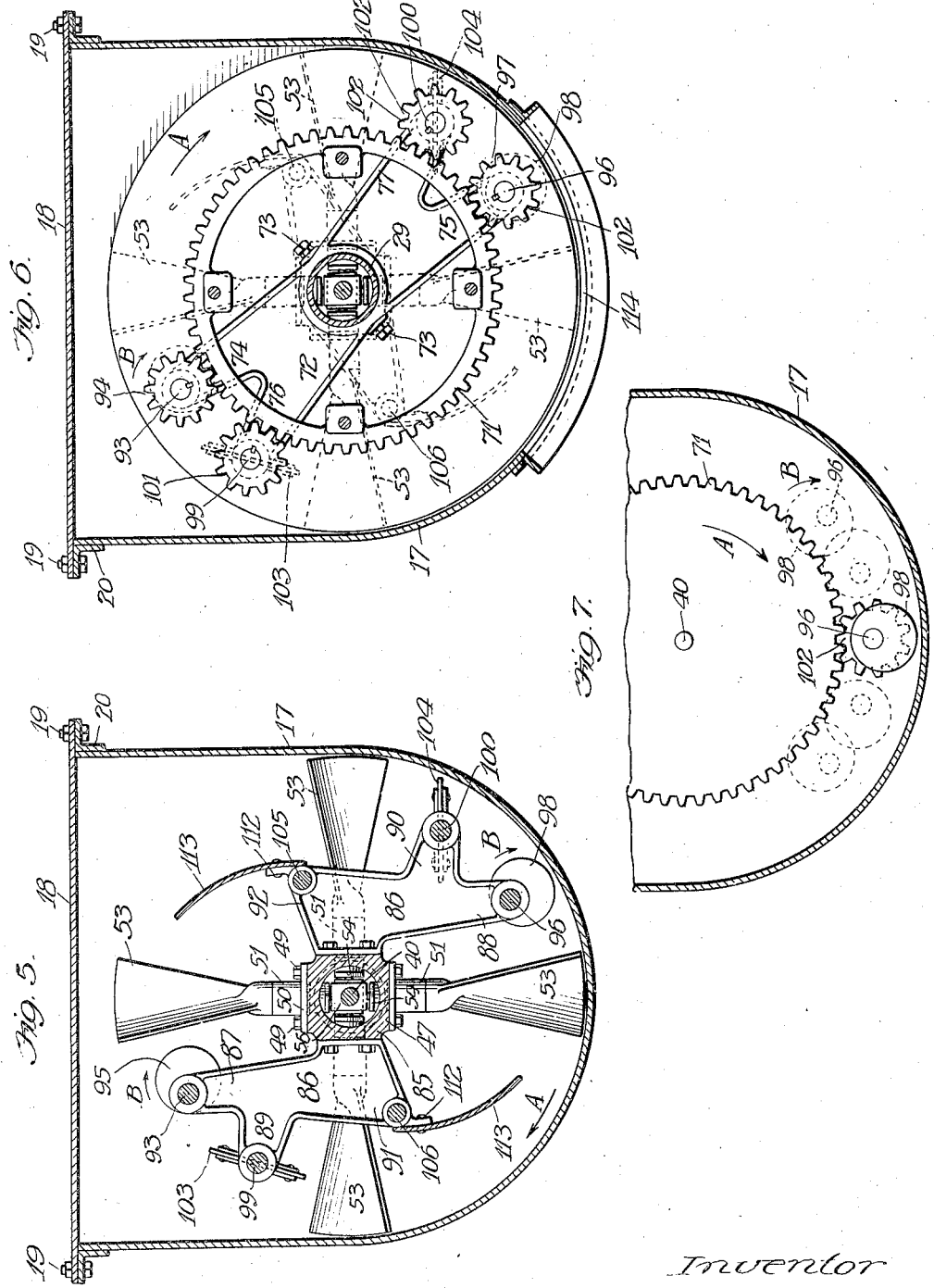

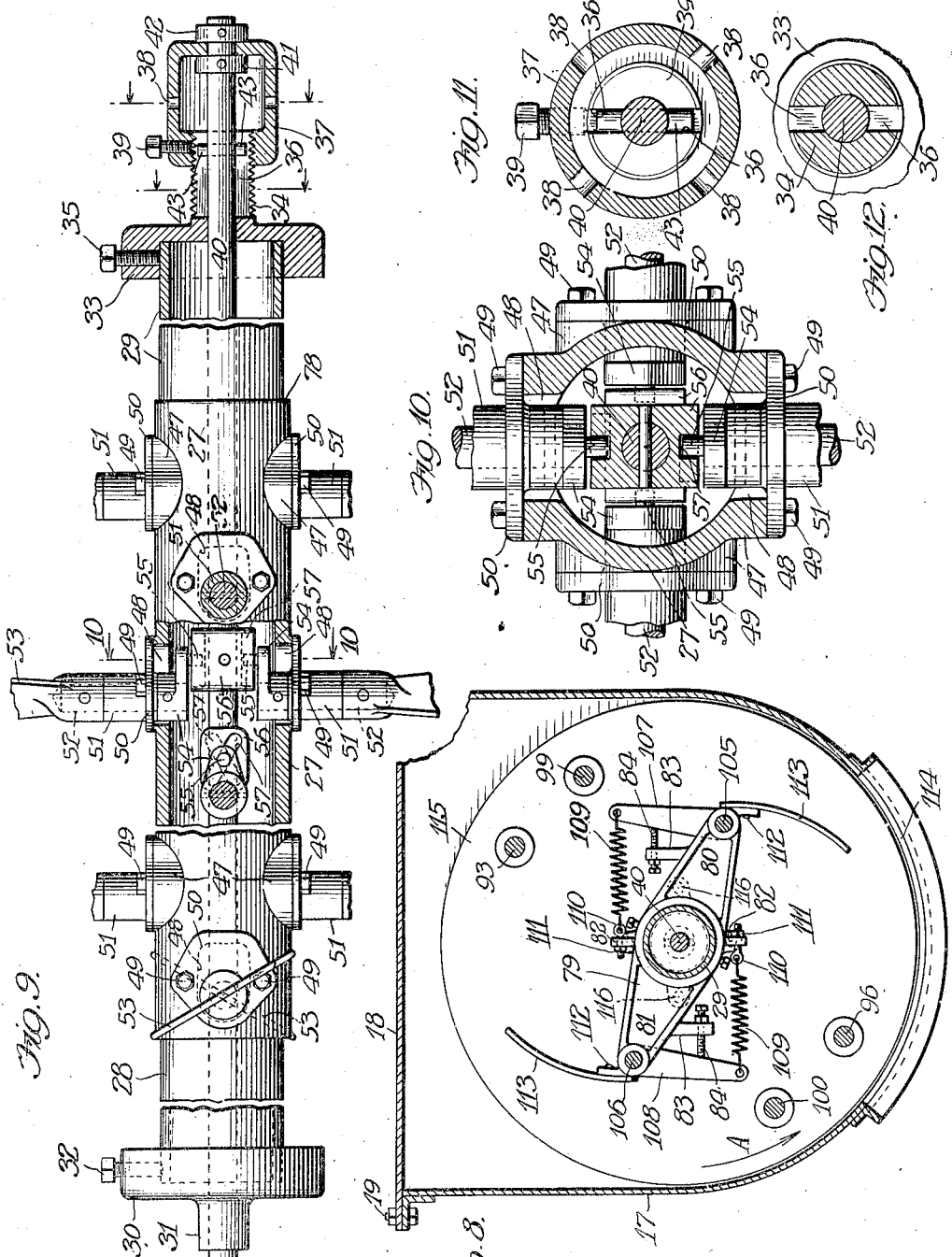

Patented Mar. 26, 1929.

1,706,417

UNITED STATES PATENT OFFICE.

JOSEPH T. SIMPSON, OF CHICAGO, ILLINOIS.

MIXING MACHINE.

Application filed August 30, 1926. Serial No. 132,381.

My invention relates to continuous mixers, and has for its object improvements in devices of that class. More particularly the object is to mix and work over material as it passes thru the machine, and to vary the extent of such mixing and working during the time the material is in the machine.

While the present invention has a variety of applications, it is herein illustrated and described as applied to preparing sand for use in foundries. Foundry sand ready for use is a mixture of various ingredients, but usually contains new sand, previously used sand, a bonding material and a tempering liquid as water. These materials must be thoroly mixed and also worked over by pressure and rubbing so that the grains of sand are individually coated with the bonding material and the whole becomes a tough and semi-plastic mass. For the making of different kinds of castings, different grades of sand are used, and these different grades are produced partly by different mixtures and partly by the thoroness with which the materials are mixed and worked over. The object of the present invention is to produce a machine which will not only accomplish the desired results in a thoro and efficient manner but one which is adjustable so that it is equally efficient in producing any one of the varied grades of foundry sand from the materials supplied to it.

In the accompanying drawings:

Fig. 1 is a plan with the cover removed;
Fig. 2 is a side elevation;
Fig. 3 is an end elevation in direction of 3 of Fig. 2;
Fig. 4 is a section on line 4—4 of Fig. 1;
Fig. 5 is a section on line 5—5 of Fig. 1;
Fig. 6 is a section on line 6—6 of Fig. 1;
Fig. 7 is a diagram showing successive positions of one of the kneading rollers;
Fig. 8 is a section on line 8—8 of Fig. 1;
Fig. 9 is a plan, partly in section, of parts of the central shaft and associated parts at an enlarged scale;
Fig. 10 is an enlarged section on line 10—10 of Fig. 9; and
Figs. 11 and 12 are enlarged sections on lines 11—11 and 12—12, respectively, of Fig. 9.

Supported on standards 15 and 16 is a trough or channel 17, the upper half of which is rectangular in cross section and the lower half of which is semi-circular. The upper part of this trough is closed by a cover 18 which is secured by bolts 19 to angle irons 20 riveted to the upper edges of the trough. The trough or channel 17 is supported directly in extensions 21 and 22 on the standards 15 and 16, and the trough and standards are connected together by the rods 23. Secured to the extension 21 of standard 15 is a hopper 24 thru which material is fed to the interior of the trough.

Mounted on standards 15 and 16 are bearings 25 and 26 in which is supported a hollow shaft 27, preferably made of a steel casting. The journals of this shaft are on parts of the reduced positions shown at 28 and 29 in Fig. 9. A collar 30 in the form of a cap with a hub 31 is secured to the shaft beyond the bearing 25 by a set screw 32. At the other end of the shaft is a collar 33 having a hub 34 and held in place by a set screw 35. The hub 34 is screw threaded on the outside, and has a transverse slot 36. Mounted on the hub 34 is a hollow nut 37, provided with radial holes 38 for the application of a wrench to adjust it on the hub 34. A set screw 39 serves to hold the nut 37 at any desired adjustment.

Extending thru the shaft 27, and supported in the hubs 31 and 34, is a rod 40 having collars 41 and 42 pinned thereto. One of these collars is inside of the nut 37 and the other outside, and they are so arranged that an adjustment of the nut 37 on the hub 34 serves to adjust the rod 40 longitudinally in the shaft 27. A transverse pin 43 extending into the slot 36 serves to cause the rod to turn with the shaft. A gear 44 secured to the shaft 27 between bearing 25 and collar 30 serves as a means for driving the shaft 27. A pinion 45 on the same shaft with pulleys 46 serves to drive the gear 44.

On the shaft 27 are bosses 47 arranged in pairs so that one pair of bosses are directly opposite each other and the next pair are at right angles to the first pair. The pairs of bosses thus alternate thruout the entire length of the shaft between the bearings 25 and 26. Each boss is provided with an opening 48 connecting the interior of the shaft 27 with the exterior.

Secured to each boss 47 by bolts 49 is a plate 50 having a hub 51 thereon. Extending thru each hub 51 as a bearing is a spindle 52 having a conveyor flight 53 secured to its outer end and a crank arm 54 secured to its inner end. Each crank arm has a crank pin 55. Secured to the rod 40 adjacent to each pair of crank pins 55 is a block 56 having cam slots 57 in its opposite faces for receiving the pins 55. It will be evident that by adjusting the rod 40 longitudinally in the shaft 27, the flights 53 will be adjusted rotatively with respect to their bearings 51.

On the portion 28 of shaft 27, and adjacent to the bearing 25, is a collar 58, held in place by screws 59. (Fig. 1.) This collar carries two flights 60 which may be fixed or may be made adjustable by set screws. Next to the collar 58 is a casting 61 held in place on shaft 27 by set screws 62. The casting 61 has arms 63, 64, 65, 66, 67, and 68 (Fig. 4) arranged to carry shafts. Between the collar 58 and the casting 61 is a disk 69 (Fig. 1), which is secured to the casting 61 at points 70. The purpose of this disk is to protect the bearings in the arms of casting 61 from material entering the machine thru hopper 24. Another purpose is to cause the material which enters the hopper 24 to flow to the main body of the trough 17 in a stream of predetermined depth.

Secured to the inner face of the extension 22 of standard 16 is a stationary gear 71, and next to this is a casting 72 fixed on the part 29 of shaft 27 by means of set screws 73. The casting 72 has arms 74, 75, 76, and 77, which correspond to, and are in line with, the arms 63 to 66 of casting 61.

Secured on the part 29 of shaft 27, and next to the shoulder 78, is a casting 79 having arms 80 and 81 which correspond to, and are in line with, the arms 67 and 68 of spider casting 61. Also on the casting 79 are lugs 82 for receiving eye bolts and nuts as will be hereinafter described. And on the arms 80 and 81 are lugs 83 for receiving adjusting stop screws 84.

At the center of the length of the shaft 27 are two extra bosses 85 which correspond to the bosses 47, and to these bosses 85 are bolted brackets 86. The brackets 86 have arms 87 to 92 which correspond to, and are in line with, the arms 63 to 68 on spider 61.

Supported in the arms 63, 74 and 87 is a shaft 93 which carries a small gear 94 which engages and has a planetary movement around gear 71. Secured on the shaft 93 are short eccentric rollers 95. Supported in the arms 64, 75 and 88 is a shaft 96 which carries a similar gear 97 for engaging the stationary gear 71. Secured on the shaft 96 are other short eccentric rollers 98. The rollers 95 and 98 are called mulling or kneading rollers, and are placed irregularly on their shafts as shown in Fig. 1.

Supported in the arms 65 and 66, 76 and 77, and 89 and 90, are shafts 99 and 100 which have gears 101 and 102 engaging the fixed gear 71 in the same manner. Secured in any suitable manner to the shafts 99 and 100 are mixing plates 103 and 104.

Supported in the arms 67 and 68, 80 and 81, and 91 and 92, are shafts 105 and 106. Secured on these shafts adjacent to the supporting arms 80 and 81, are levers 107 and 108. The outer ends of levers 107 and 108 are connected by springs 109 to eye bolts 110 which extend thru lugs 82. Nuts 111 serve to adjust the tension of springs 109. Adjustable stop screws 84 serve to limit the inward movement of levers 107 and 108 under tension of the springs 109.

Secured at intervals along the shafts 105 and 106 are short arms 112, and secured to these arms are curved plates 113. The springs 109 act to move these plates toward the inner curved surface of the shell 17, and the adjustable stops 84 serve to limit the nearness of this approach.

Sand prepared for use in the foundry usually consists of a mixture containing predetermined proportions of new sand, sand previously used in the making molds, a bonding material such as clay, and some tempering liquid as water. These materials are fed in unmixed condition into the chamber at the left of plate 69. The operation of the flights 60 cause these materials to flow under the edge of the plate 69 into the trough 17, which is the receptacle in which the unmixed materials are mixed and prepared for use in molding.

In addition to the mere operation of mixing the materials, the grains of sand must be coated individually with the bonding material so that they will adhere to each other when used in the foundry. To accomplish this result efficiently it is necessary that the materials be mixed, be pressed together preferably with a rubbing action, be partly loosened up by turning them over for mixing, be again pressed together, again turned over and mixed, and so on alternately until the sand is in proper condition for use in the foundry.

As the materials enter the machine they are engaged by the flights 60 and forced under the plate 69 into the main body of the machine. Here they are engaged by the flights 53 and conveyed toward the right and are finally discharged thru the bottom opening 114 (Fig. 2). A plate 115 secured to lugs 116 on part 79 (Fig. 8) serves to make a chamber at the right hand end of the machine and prevent the material conveyed to the opening from getting into those gears.

The flights 53 do a certain amount of mixing, but their main purpose is that of conveying the material from the intake at 24 to the discharge opening at 114. By adjusting the nut 37, these flights are turned on their pivotal bearings in hubs 51 so as to change their angles, and consequently to vary the rate at which material is conveyed thru the machine. As the pressing and turning operations remain constant, adjusting the rate of movement thru the machine varies the extent to which the material is worked over before it is discharged.

As previously described, the shafts 93 and 96 have planetary gears which travel around the stationary gear 71 in the direction of the arrows A in Figs. 4, 5, 6, 7 and 8. This causes these shafts and their rollers to turn in their bearings in the direction of the arrows B. In Fig. 7, the same roller is shown in successive positions. By examining this view it will be seen that the surface of a roller which is adjacent to the shell 17 moves forward more rapidly than does the center of the roller itself. If these rollers were loose on their shafts, then, as the shafts moved in the direction A, the rollers would roll on the material in the shell 17 and this would cause the rollers to turn on their shafts in a direction opposite to B. But being fast on their shaft, and the shafts being driven by planetary gears engaging the exterior of gear 71, the rollers are driven in a direction opposite to that in which they would move if they simply rolled on the material in the shell 17. Owing to this drive, and the fact that the rollers are eccentrically placed on their shafts, these rollers have both a rubbing and a kneading or mulling action on the material passing thru the machine.

The mixing plates 103 and 104 are driven in the same way by planetary gears traveling around gear 71. As a consequence, the edges of these plates which are nearest to the shell 17 move forward more rapidly than do the shafts which carry them. This action results in these mixing plates lifting the material from the lower part of the shell and turning it over. This is a real mixing operation.

The shafts 105 and 106 are normally held in a fixed position by springs 109 and stops 84, but may be moved by a force which will overcome the tension of the springs. When the material is turned over by the mixing plates 103 and 104, it is sometimes piled up in heaps. If the rollers 95 or 98 should come to such heaps they would push thru them instead of mulling them. By inspection of Fig. 4 it will be seen that the plates 113 come behind the mixing plates 103 and 104 and in front of the rollers. As so arranged, the plates 113 serve to level the material in the shell and thus prepare it for the rollers.

From the foregoing description it will be seen that the material in the machine is moved steadily forward from the intake to the discharge by the conveyor flights. While these flights are for conveying purposes, they do a certain amount of mixing, as it would be impossible to pass the material thru the machine by the action of these flights without causing mixing.

The mixing plates are the main mixing means as they turn the material over and over. In this connection it may be observed that the conveyor flights in their motion make transverse cuts in the stream of material as it moves longitudinally thru the machine, and that the mixing plates operate on the same material at right angles to the action of the conveyor flights. The result is to make the two co-operate in the mixing operation.

The action of the rollers is to both press and rub the material, and these actions of themselves tend to further mix the material. But these rollers are made in short sections and secured in unmatched relationship to each other. The result is that these rollers aid in the mixing operation because the pressure of a short roller into a body of material will cause the material to flow laterally from under the roller, and such lateral flow results in a mixing operation.

What I claim is:

1. In a mixer, a receptacle having intake and discharge openings, conveying devices for moving material thru the machine, mixing devices and mulling devices arranged to operate on material as it passes thru, and means for adjusting the conveying device so as to vary the length of time during which the material is operated upon by the mixing and mulling devices.

2. In a mixer, a receptacle having intake and discharge openings, a main shaft provided with connections for driving it, conveyor flights carried by said shaft and operating to move material thru the machine, devices for turning the material as it is being moved, and rollers also carried by said shaft and serving to mull the material as it is being moved by said flights.

3. In a mixer, a receptacle having an opening for the reception of unmixed materials, a conveyor arranged to move the received materials thru the receptacle to a discharge opening, devices connected to and operated by the conveyor for mixing and other devices for working the materials as they are being moved thru the receptacle by the conveyor, and means for adjusting said conveyor independently of the other devices so as to vary the extent to which the materials are operated upon by the mixing and working devices during their passage thru the receptacle.

4. In a mixer, a receptacle in the form of a trough and having intake and discharge openings, a power driven shaft extending longitudinally thru said receptacle, conveyor flights carried by said shaft and serving to move materials from the intake to the discharge opening, devices for adjusting the flights on the shaft so as to vary the rate at which materials are moved thru the receptacle, and mixing devices and working devices carried by the shaft and arranged to mull the materials as they are being moved thru the receptacle by the conveyor.

5. A conveyor channel, a hollow shaft located in said channel and provided with connections for driving it, pivoted conveyor flights carried by said shaft and serving to move material thru the channel, devices located within the shaft for turning said flights on their pivots so as to vary the rate at which material is conveyed, and connections extending to the exterior of the shaft for operating said devices.

6. A conveyor channel, a hollow shaft in said channel, pivoted conveyor flights carried by said shaft, means operating thru the interior of the shaft to adjust said flights on their pivots so as to vary the rate material is moved thru the channel, devices carried by said shaft and operating upon the material being moved in the channel, and means located at one end of said channel for controlling the operation of said devices.

7. A conveyor channel, an adjustable conveyor located in said channel, mulling devices carried by said conveyor and serving to operate upon material as it is being conveyed by the conveyor, and means located at one end of the channel for controlling the operations of said devices.

8. A conveyor channel, a hollow shaft in said channel, conveyor flights provided with pivots extending to the interior of the shaft, a rod supported in the interior of the shaft and provided with connections to the pivots for the flights, and means for adjusting the rod with respect to the shaft so as to vary the angle of the flights to the channel within which they operate.

9. A conveyor channel provided with an intake at one end and a discharge opening at the other, means located adjacent to the intake for limiting incoming material to a layer of predetermined thickness, a variable conveyor for moving the incoming material along the channel to the discharge opening, and devices for mixing and mulling material as it is being conveyed.

10. The combination with conveying devices, devices for mixing material while being conveyed by the conveying devices, and other devices for mulling the material at the same time, of interconnections by which one drives the others, and means for varying the speed of one of them with respect to the other two.

11. The combination with conveying devices, devices for mixing material while being conveyed, and devices for mulling the material at the same time, of gears connecting the three devices together, and means for varying the speed of one of them with respect to the other two.

12. A receptacle for material to be worked over, eccentric mulling rollers, and means for driving said rollers so as to mull the material in said receptacle.

13. A receptacle for material to be worked over, a shaft provided with means for moving it, and a series of short eccentric rollers secured to said shaft at positions angularly displaced with respect to each other, said rollers being arranged to operate on material in said receptacle.

14. The combination with a receptacle, and devices for conveying material therethru, of a shaft driven by the conveying devices, and eccentrically placed rolls mounted upon said shaft and arranged to engage material being conveyed thru said receptacle.

15. In a mixer, a conveyor shaft arranged to move material from an intake to a discharge opening, mixing and mulling devices carried by said shaft and angularly displaced from each other, and leveling plates located in advance of the mulling devices and serving to prepare the mixed material for action by said mulling devices.

16. A channel having intake and discharge openings, a conveyor shaft provided with flights for moving material from one opening to the other, mixing devices carried by the shaft between the flights and serving to turn the material over and over as it is being conveyed, mulling rollers also carried by the shaft between the flights and serving to work the material as it is being mixed and conveyed, and spring-actuated leveling devices also carried by the shaft and located behind the mixing and before the mulling rollers.

17. A continuous mixer having intake and discharge openings, a conveyor arranged to move material from one opening to the other, mixing and mulling devices carried by the conveyor and arranged to operate on material as it is being conveyed, and leveling devices carried by the conveyor between the mixing and mulling devices.

18. In a continuous mixer, a channel having intake and discharge openings, a shaft provided with means for conveying material from one opening to the other, devices for mixing and mulling material as it is being conveyed, and leveling devices located between the mixing and mulling devices and serving to prepare mixed material for action by the mulling devices.

19. A channel, a shaft extending longitudinally thru said channel, means by which material may be fed into one end of said channel, a conveying device arranged to move the incoming material into the body of the channel, a transverse plate located in the channel adjacent to the conveying device and serving to limit the thickness of the material moved into the body of the channel by the conveying device, and devices for operating upon the material after it has been moved past said plate.

20. A channel provided with intake and discharge openings, a transverse plate, dividing off a small chamber in the channel adjacent to the intake opening and leaving a limited opening beneath, a device located in said chamber and serving to push incoming material thru said opening, a shaft extending thru said plate and operating said device, a conveyor operated by said shaft and serving to move material along in the channel to the discharge opening, and devices carried by the shaft and operating upon material as it is being conveyed.

21. A channel provided with intake and discharge openings, partitions dividing off small portions of the channel at each end, the partition at the intake end being arranged to leave an open space thereunder, a power driven shaft supported in said channel and extending thru said partitions, a device located in the chamber at the intake end of the channel and serving to move material thru said open space and into the body of the channel, conveyor flights carried by the shaft and serving to move material thru said channel to the discharge opening, other devices arranged to operate on the material while being so conveyed, and connections located in the chamber at the discharge end and serving to operate said other devices from said shaft.

22. A channel having intake and discharge openings at its opposite ends, a partition forming a chamber at the discharge end, a power driven conveyor serving to move material thru said channel from the intake to the discharge, devices arranged to operate on the material as it is being conveyed, and connections located in said chamber and serving to drive said devices from said conveyor.

23. A channel having intake and discharge openings at opposite ends, partitions forming chambers at the ends of the channel, the partition at the intake end providing a passageway of a predetermined size, a power driven conveyor for moving material from the intake to the discharge openings, a device located in the intake chamber and serving to move material thru said passageway to the conveyor, other devices arranged to operate upon material as it is being conveyed, and driving connections between said conveyor and said other devices and located within the chamber at the discharge end.

24. A channel having intake and discharge openings at opposite ends, a conveyor arranged to move material from one opening to the other, means by which material is moved to the conveyor at the intake in a layer of predetermined thickness, devices for working the material as it is being conveyed, and leveling plates arranged to smooth the surface of the worked material so as to maintain the material in a layer approximating that at which it enters the conveyor.

25. In a machine of the class described, a channel having intake and discharge openings, a main shaft extending longitudinally thru said channel, arms mounted upon opposite ends of said shaft, other shafts supported on the ends of said arms and parallel with the main shaft, mulling devices carried upon said shafts, and an adjustable conveyor carried by the main shaft and serving to move material from intake to discharge openings as it is being mulled by said mulling devices.

26. In a machine of the class described, a channel provided with intake and discharge openings, an adjustable conveyor arranged to move material continuously from one opening to the other, arms mounted upon said conveyor, shafts carried by said arms and parallel with said conveyor, and mulling devices carried by said shafts and arranged to operate on material as it is being conveyed.

27. In a machine of the class described, a channel provided with intake and discharge openings, a conveyor for moving material from one opening to the other, arms carried by the conveyor, shafts supported in the ends of the arms, mulling devices carried by said shafts, and means for adjusting the speed relationship between conveying and mulling devices.

28. In a machine of the class described, a conveyor for moving material, a channel in which said conveyor operates, arms carried by the conveyor, mixing plates supported in bearings in said arms, driving connections rotating said plates in their bearings as the conveyor operates, and means for varying the speed relationship between the conveying and the mixing devices.

29. In a device of the class described, a conveyor arranged to move material from receiving to discharge points, arms carried by the conveyor, mixing plates supported in bearings at the ends of the arms, means for causing the mixing plates to turn in their bearings as they are carried around by the conveyor, and means for varying the speed relationship between the conveyor and the mixing plates.

30. In a device of the class described, a conveyor arranged to move material from intake to discharge openings, means for determining the thickness of the body of material entering at the intake opening, devices carried by the conveyor and acting on the material to disturb the evenness of the surface of the material moved by the conveyor, and leveling plates also carried by 31. In a machine of the class described, a channel provided with intake and discharge openings, conveying devices for moving material from one opening to the other, spring actuated smoothing plates carried by the conveying devices and acting upon the surface of the material being conveyed, and adjustable stops for limiting the action of the smoothing plates.

32. In a machine of the class described, a channel provided with intake and discharge openings, conveying devices for moving material from one opening to the other, mixing devices carried by the conveying devices and arranged to turn the material over and over as it is being conveyed, and spring actuated smoothing devices carried by the conveying devices and arranged to act upon the surface of the material disturbed by the mixing devices.

33. In a machine of the class described, a channel provided with intake and discharge openings, conveying devices for moving material from one opening to the other, mulling rolls carried by the conveying devices and arranged to act upon the material as it is being conveyed, and spring actuated smoothing plates carried by the conveying devices and arranged to act upon the surface of the material to prepare it for said mulling rolls.

34. In a machine of the class described, a channel provided with intake and discharge openings, conveying devices for moving material from one opening to the other, mulling rolls carried by the conveying devices around the axis of the channel and acting upon the material being conveyed, smoothing plates similarly carried by the conveying devices and serving to prepare the surface of the material for the rolls, and mixing devices also carried by the conveying devices and arranged to turn the material over after it has been acted upon by said rolls.

35. In a machine of the class described, a channel provided with intake and discharge openings, conveying devices for moving material from one opening to the other, mulling rolls supported in bearings and carried by the conveying devices around the axis of the channel, mixing devices similarly supported and carried, means by which the mulling rolls and mixing devices are caused to turn in their bearings as they move about the axis of the channel, and means for varying the speed of conveying as compared to the speed of the mulling rolls and mixing devices.

36. In a machine of the class described, a channel provided with intake and discharge openings, conveying devices for moving material from one opening to the other, spiders carried by the conveying devices and having bearings in the arms thereof, shafts supported in said bearings and parallel with the axis of the channel, mulling rolls on some of said shafts and mixing devices on others of said shafts, means for turning said shafts in their bearings to operate the rolls and the mixing devices, and means for varying the speed of said conveying devices without at the same time changing the speed of the mulling and mixing devices.

37. In a machine of the class described, a channel provided with intake and discharge openings, conveying devices for moving material from one opening to the other, means operated by the conveying devices for causing the material to enter the channel in a layer of predetermined thickness, and mixing and mulling devices arranged to operate on the material as it is being conveyed.

38. In a machine of the class described, a channel provided with intake and discharge openings, conveying devices for moving material from one opening to the other, devices carried in bearings supported by the conveying devices and moved about the axis of the channel by the operation of the conveying devices, gears located at the discharge end of the channel and serving to turn said devices in their bearings, and a protecting plate forming a chamber for said gears and serving to prevent material moved by the conveying devices from engaging said gears.

39. In a machine of the class described, a channel provided with intake and discharge openings, conveying devices for moving material from one opening to the other, mixing and mulling devices carried in bearings supported by the conveying devices, gears located in said channel adjacent to the discharge opening thereof and serving to turn said mixing and mulling devices in their bearings, and a protecting plate supported within the channel adjacent to said gears and serving to shield them from contact by the material moved by the conveying devices to the discharge opening of the channel.

40. In a machine of the class described, a channel provided with intake and discharge openings, conveying devices for moving material from one opening to the other, arms carried by the conveyor, shafts supported in the ends of the arms, mulling devices consisting of eccentric rolls secured to said shafts, and gears operated by the conveying devices for turning said shafts in their bearings so as to give a positive drive to said rolls.

41. In a machine of the class described, a channel provided with intake and discharge openings, conveying devices for moving material from one opening to the other, mulling rolls carried by the conveying devices and moved thereby in an orbit about the axis of the channel, and gears serving to give said rolls a positive drive so as to cause them to work to continually varying depths into the material as it is being conveyed.

42. In a machine of the class described, a channel provided with intake and discharge openings, conveying devices for moving material from one opening to the other, a shaft supported in bearings carried by the conveying devices and moved thereby in an orbit about the axis of the channel, a roll secured in an eccentric position on said shaft, and positive drive connections for turning said shaft in its bearings so as to cause said roll to work to varying depths in the material as it is being conveyed by the conveying devices.

43. In a machine of the class described, means for moving material in a substantially uniform stream from one point to another, mulling rolls movable transversely across the stream of material as it moves, and means for causing said rolls to operate to predetermined and varying depths in said material.

44. In a machine of the class described, conveying devices for moving a layer of material from one point to another, means for determining the thickness of such layer, mulling rolls operating upon the moving material by a movement which is transverse to the movement of the material, means for causing said rolls to operate to varying depths in the moving material, and driving connections between the conveying devices and the mulling rolls.

45. In a machine of the cless described, conveying devices for moving a layer of material from one point to another, means for determining the thickness of such layer, mulling rolls operating upon the material by a movement which is transverse to the movement of the material, driving connections so that one is driven from the other, and means for adjusting the conveying speed independently of the speed of the mulling rolls.

JOSEPH T. SIMPSON.